Figure 6:
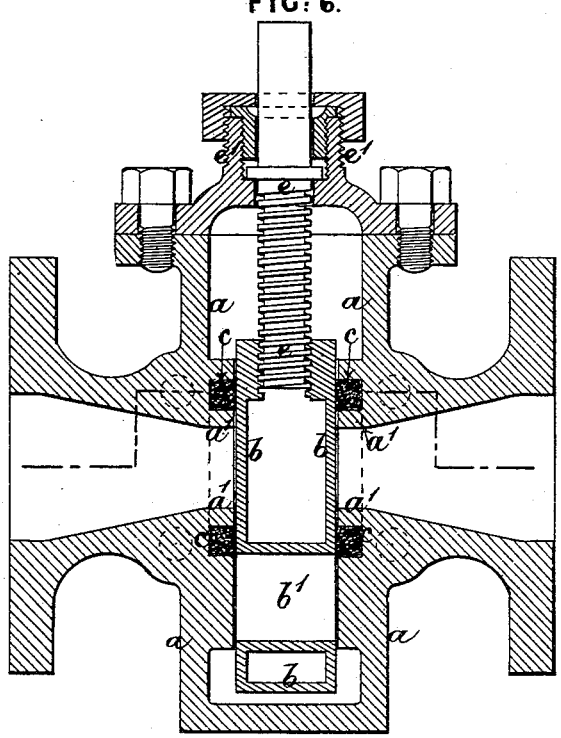

2 Sheets--Sheet 1.
J. MALLINSON.
Stop-Cock.
No. 166,472.
Patented Aug. 10, 1875.
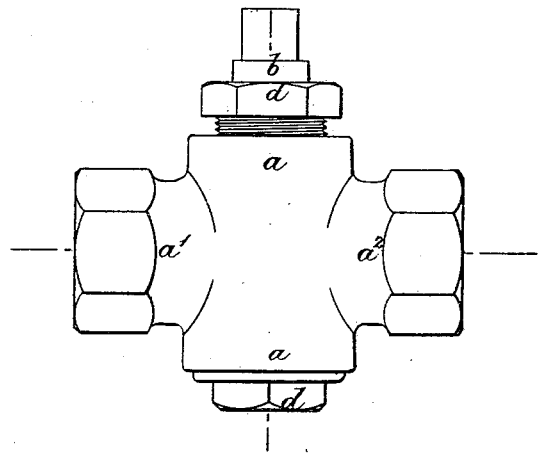
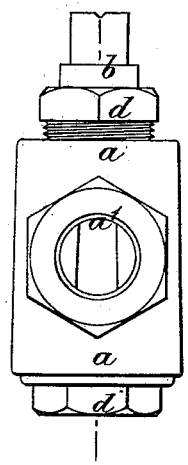
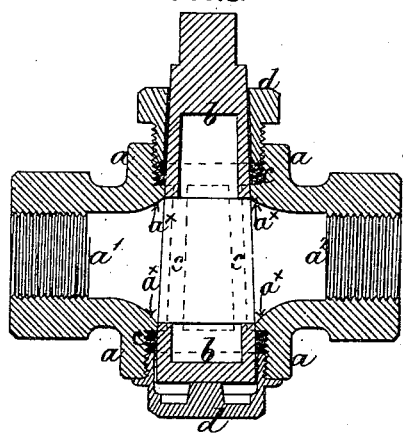
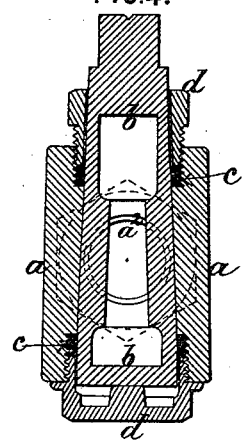
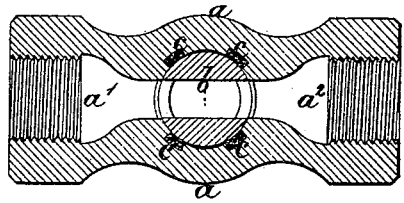
WITNESSES
INVENTOR
James Mallinson.
By Wm D. Baldwin his Attorney J. MALLINSON.
Stop-Cock.

No. 166,472.   Patented Aug. 10, 1875.

WITNESSES
Wm J. Peyton
H. C. Bowie

INVENTOR
James Mallinson
By Wm D. Baldwin his Attorney

UNITED STATES PATENT OFFICE.

JAMES MALLINSON, OF WELWYN, ENGLAND.

IMPROVEMENT IN STOP-COCKS.

Specification forming part of Letters Patent No. 166,472, dated August 10, 1875; application filed July 6, 1875.

*To all whom it may concern:*

Be it known that I, JAMES MALLINSON, of Welwyn, in the county of Herts, England, a subject of the Queen of Great Britain, have invented or discovered new and useful Improvements in Steam and other Cocks and Valves; and I, the said JAMES MALLINSON, do hereby declare the nature of the said invention, and in what manner the same is to be performed, to be particularly described and ascertained in and by the following statement thereof—that is to say:

The object of this invention is the construction of steam and other cocks and valves with packing introduced into a space provided for it, and extending around the passages or water-ways in the shell. This packing is excluded from the passages or water-ways by raised ribs or lips, and is compressed in the direction of the length of the plug by a gland or otherwise, and it prevents leakage in any direction. The tightness of the cock is thus wholly dependent on the packing, and in nowise upon the fit of the metallic parts.

Sluice and slide valves may be rendered tight by packing in a similar manner.

In sluice or slide valves the water or fluid way in the body or main casting is opened or closed by means of a block or plug sliding usually at right angles to the direction of flow.

I form around the fluid-ways in the body or main casting raised ribs or lips, and outside these and all around the fluid-way in each case I form a cavity or channel to receive packing. The body is open at the two sides to allow the packing to be inserted, and when the packing has been put in with a calking-tool, covers are fixed over the side openings, and they hold the packing securely in its place.

The sliding block or sluice works between the packings, and thus the tightness of the joint is independent altogether of accuracy of metal fitting.

Sometimes, in place of providing side openings in the body, I have the openings at the top and bottom.

In order that my said invention may be most fully understood and readily carried into effect, I will proceed to describe the drawings hereunto annexed.

Figure 1 is an elevation, Fig. 2 a front view, Fig. 3 a longitudinal section, Fig. 4 a transverse section, and Fig. 5 a horizontal section, of a cock constructed according to my invention.

$a\ a$ is the shell of the cock with its inlet and outlet passages $a^1\ a^2$. In it are provided cavities for packing around the passages $a^1\ a^2$. $b$ is the plug which is inserted within the shell. The passages or water-ways $a^1\ a^2$ are surrounded within the shell by raised ribs or lips $a^\times$, of which the form preferred is clearly seen in Fig. 3. These lips and the other portions of the shell where the packing does not extend are bored out to form a seat to receive the plug $b$ easily between them; but no reliance is placed on obtaining fluid-tight contact between the shell and the plug, and the use of the lips is solely to exclude the packing from the water or fluid ways. $c$ is the packing—that which I usually employ is hemp; but other packing material may be employed. It is well rammed into the packing-space, while the plug is held down by any convenient means. The covers or glands $d\ d$ are then screwed home.

Figure 7:
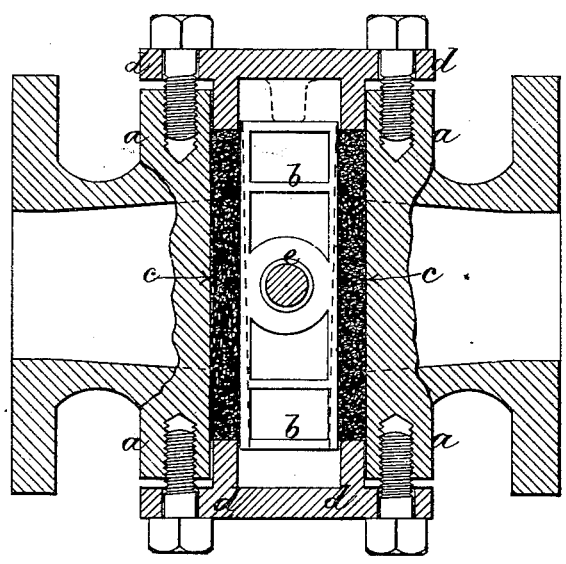

Fig. 6 is a vertical section, and Fig. 7 is a horizontal section, of a sluice-valve constructed according to my invention.

Figure 8:
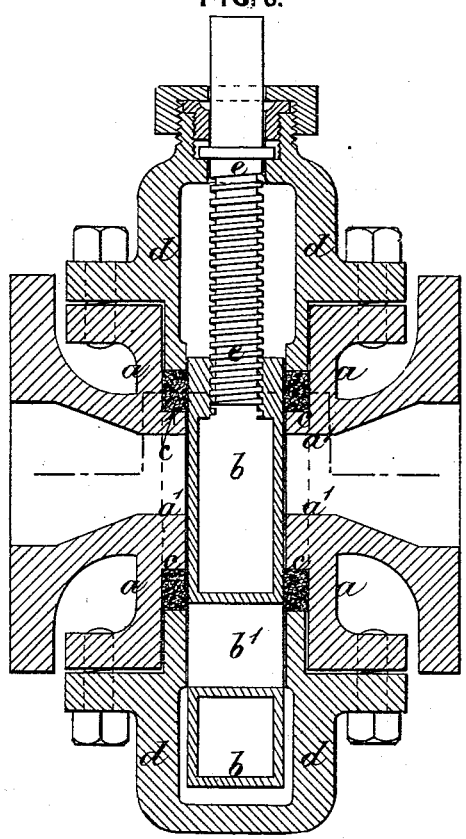
Figure 9:
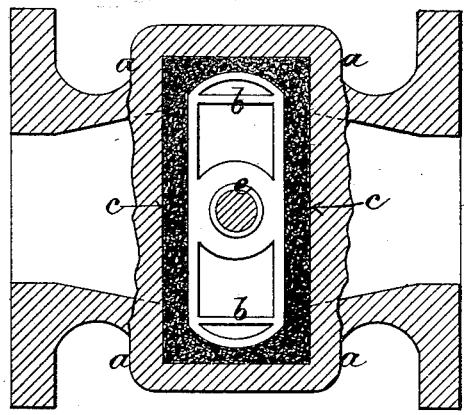

$a$ is the main shell or casting. $b$ is the plug block or slide with the water-way $b'$ through it. $a^1\ a^1$ are lips around the water-way of the shell, between which the block $b$ is able to slide freely in its seat therein. $c\ c$ is the packing, which is forced into the cavities around the lips $a^1$, and held in place and compressed by means of the covers or bonnets $d\ d$, which are secured by screws. $e$ is the screw, by turning which the block or plug $b$ is raised and lowered. The screw passes through a stuffing-box at $e'$, and it engages with a screw-thread cut in the block or slide $b$. I sometimes make the block $b$ somewhat taper from side to side, as indicated by dotted lines in Fig. 7, and I provide a guide or stop on one of the covers or bonnets $d$ for it to rest against, so that by screwing up this cover or bonnet the tightness of the block or slide between the packings may be adjusted. In place of the covers or bonnets being at the sides they may be at the top and bottom, as is shown at Figs. 8 and 9. In this case the screw $e$ is in one of the covers or bonnets, and the packing completely surrounds the block or slide *b*.

What I claim is—

1. The cock or valve shell, constructed substantially as hereinbefore set forth, with a fluid-way or passage therethrough, a plug-seat therein, and packing cavities around the fluid-way or passage.

2. The combination, substantially as hereinbefore set forth, of the shell having a plug-seat and fluid-passage, the lips on the shell, the cavities provided with packing, and the plug surrounded by said lips and working in contact with the packing.

3. The combination, substantially as hereinbefore set forth, of the shell having a way or passage for the fluid, and a plug-seat, the plug, the packing, and the removable covers securing the packing in place.

JAMES MALLINSON.

Witnesses:
 WILMER M. HARRIS,
 G. F. WARREN,
*No. 17 Gracechurch Street, London, E. C.*